(12) United States Patent
Hillmann et al.

(10) Patent No.: US 11,295,548 B2
(45) Date of Patent: Apr. 5, 2022

(54) DISPLAY HAVING INTEGRATED MATRIX SENSOR AND METHOD FOR OPTICALLY CAPTURING THE PAPILLARY STRUCTURE OF AT LEAST ONE FINGER BY MEANS OF THE DISPLAY

(71) Applicant: JENETRIC GmbH, Jena (DE)

(72) Inventors: Juergen Hillmann, Jena (DE); Tom Michalsky, Leipzig (DE); Undine Richter, Jena (DE); Joerg Reinhold, Jena (DE); Philipp Riehl, Jena (DE)

(73) Assignee: JENETRIC GMBH, Jena (DE)

( * ) Notice: Subject to any disclaimer, the term of this patent is extended or adjusted under 35 U.S.C. 154(b) by 0 days.

(21) Appl. No.: 17/277,570

(22) PCT Filed: Sep. 17, 2019

(86) PCT No.: PCT/DE2019/100819
§ 371 (c)(1),
(2) Date: Mar. 18, 2021

(87) PCT Pub. No.: WO2020/057695
PCT Pub. Date: Mar. 26, 2020

(65) Prior Publication Data
US 2021/0286967 A1    Sep. 16, 2021

(30) Foreign Application Priority Data

Sep. 18, 2018    (DE) .................... 10 2018 122 872.4

(51) Int. Cl.
*G06V 40/12*    (2022.01)
*G06V 40/13*    (2022.01)
*G06V 40/16*    (2022.01)

(52) U.S. Cl.
CPC ...... *G06V 40/1347* (2022.01); *G06V 40/1318* (2022.01); *G06V 40/1335* (2022.01); *G06V 40/167* (2022.01)

(58) Field of Classification Search
CPC .......... G06V 40/1347; G06V 40/1318; G06V 40/1335; G06V 40/167; G06F 3/0412
See application file for complete search history.

(56) References Cited

U.S. PATENT DOCUMENTS

2013/0120760 A1    5/2013 Raguin et al.
2017/0161543 A1    6/2017 Smith et al.
(Continued)

FOREIGN PATENT DOCUMENTS

CN    207851850 U    9/2018
DE    102015116026 A1    3/2017
(Continued)

OTHER PUBLICATIONS

International Search Report from PCT/DE2019/100819, filed Sep. 17, 2019, dated Dec. 3, 2019.
(Continued)

*Primary Examiner* — Premal R Patel
(74) *Attorney, Agent, or Firm* — Patentbar International P.C.

(57) ABSTRACT

A display with integrated matrix sensor for the optical recording of the papillary structure of at least one finger (F), in which an angular diaphragm with an aperture is arranged in each instance in front of the individual sensor elements of the matrix sensor, which aperture is offset relative to the sensor element in each instance in an offset direction ($R_V$). Because of different dimensioning of the apertures and/or different offset directions ($R_V$), the acceptance angle of the sensor elements of the matrix sensor is also influenced in direction orthogonal to the offset directions ($R_V$) so that the (Continued)

display is suitable for making a recording having an isotropic and high contrast. The invention is also directed to a method by which, using a display according to the invention with integrated matrix sensor, an initial recording is transformed into a corrected recording having an at least approximately isotropic and high contrast.

14 Claims, 10 Drawing Sheets

(56) References Cited

U.S. PATENT DOCUMENTS

| | | |
|---|---|---|
| 2018/0075278 A1 | 3/2018 | Zhang |
| 2018/0196931 A1* | 7/2018 | Cho .................. G06F 3/0412 |
| 2019/0049631 A1* | 2/2019 | Lin .................... G02B 3/0037 |
| 2019/0130155 A1* | 5/2019 | Park ..................... G09G 3/32 |
| 2021/0286963 A1* | 9/2021 | Gao .................. G06V 40/1324 |

FOREIGN PATENT DOCUMENTS

| | | |
|---|---|---|
| DE | 102018101625 A1 | 7/2019 |
| WO | 2017/045130 A1 | 3/2017 |

OTHER PUBLICATIONS

Optical Slit, Wikipedia Processing status: May 15, 2017. URL: https://de.wikipedia.org/w/index.php?title=Optischer_Spalt&oldid=165522961 [retrieved on Jul. 23, 2019].

* cited by examiner

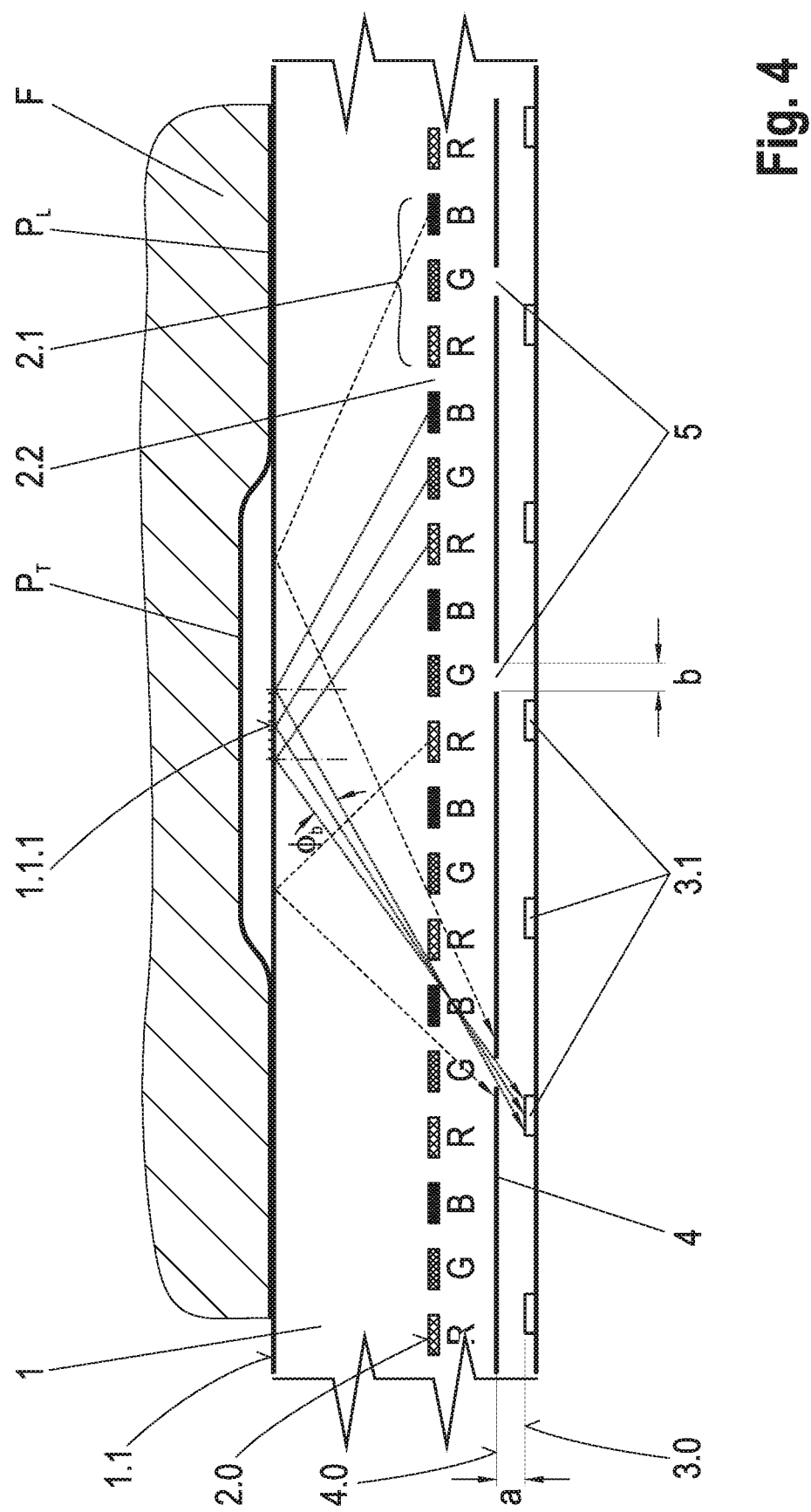

DISPLAY HAVING INTEGRATED MATRIX SENSOR AND METHOD FOR OPTICALLY CAPTURING THE PAPILLARY STRUCTURE OF AT LEAST ONE FINGER BY MEANS OF THE DISPLAY

This application is a U.S. National Stage Under 35 USC § 371 of International Application PCT/DE2019/100819, filed on Sep. 17, 2019, which in turn claims priority to German Patent Application DE 10 2018 122 872.4, filed Sep. 18, 2018, both of which are incorporated herein by reference in their entirety.

FIELD OF THE INVENTION

Persons may be reliably identified via the papillary structure of the fingers. For this reason, the fingerprint, as map of the papillary structure, has already been used for a long time to identify persons. The papillary structure is characterized by the papillary ridges (papillary lines) and the papillary valleys located at a depth therebetween which are characterized, inter alia, by their path (line path direction).

BACKGROUND OF THE INVENTION

A display with integrated matrix sensor, according to the invention, can also be used in principle to record tissue structures other than the papillary structure of fingers insofar as they have line-shaped peaks and line-shaped valleys. The recording of the papillary structure of one or more fingers simultaneously is the most common case of application for a display according to the invention.

Optical fingerprint recording devices have long been based on the principle of lens-based optical mapping of the boundary layer between a finger and a glass prism. The principle of frustrated total reflection (FTIR—frustrated total internal reflection) with oblique light incidence allows the papillary structure to be captured with high contrast because the light at those points where the papillary lines touch the prism surface is coupled out of the prism into the finger and is totally reflected between the papillary lines.

With the use of so-called direct sensors which eschew a lens-based imaging system, novel possibilities result for fingerprint recording devices. The devices can be constructed appreciably smaller because imaging optics are no longer necessary and no glass prisms need be used. The light reflected at a placement surface or platen of a cover glass beneath a finger placed thereon is directly reflected onto a matrix sensor. Image generating mechanisms differ depending on construction. In this regard, the maximum distance between the finger and the matrix sensor is basically determined by the reflection angle range of the image-generating light signal which proceeds from the display surface and is received by sensor elements.

In order to achieve a contrast which can be evaluated, the reflected light bundle in the sensor plane may not be expanded substantially greater than the size of the structure to be imaged. The contrast relates to the signal difference between papillary lines and papillary valleys and, within the meaning of this description, is understood as Michelson contrast.

The distances between papillary lines in human fingerprints are generally greater than 200 μm and, on the average, approximately 400 μm. The respective width of the papillary lines and papillary valleys is variable.

For the resolution of the structures to be imaged, the spacing of the sensor elements must further be less than half of the structure size to be imaged. Within the meaning of this description, the resolution relates to the spacing of the sensor elements.

For recording a human fingerprint with a distance of the platen from the sensor plane in the millimeter range, no contrast is achieved without steps for angle limitation.

The manner in which the illumination of the cover glass is carried out is decisive for the generation of recordings. If the illumination contains light rays which exceed the critical angle for total reflection when impinging on the surface of the cover glass, these light rays are totally reflected at the glass-air interface in the regions of the papillary valleys not contacting between the papillary lines of the finger lying on the platen. A signal formation from a reflection angle range above the critical angle correspondingly leads to a substantially greater signal level and an appreciably higher contrast than from a reflection angle range below the critical angle.

At the present time, a large number of electronic devices, mobile telephones and tablets among others, have a display. The primary function of such a display is electronic readout. For this reason, the quality of this display may not be impaired through additional functions such as a touch function or the function of optical recording of a fingerprint. The term "display" is not always used consistently in practice.

Within the meaning of the present application, a display is basically a single-layer or multilayer transparent or semi-transparent body with a cover layer, an integrated display matrix in a display plane, and possibly a backlight. In order that a display, e.g., with an OLED, AMOLED, QLED or LCD, can also be used as recording device for a fingerprint or other natural or artificial tissue, there have been diverse efforts made in the prior art to utilize the existing illumination of the cover layer through the display pixels of the display matrix and possibly the backlighting for an optical recording on a matrix sensor which is additionally integrated in the display and which is arranged in or below the display plane.

As mentioned above, steps must be taken to limit the reflection angle range from which light impinges on a sensor element of the matrix sensor so that the fingerprint can be imaged on the matrix sensor with a sufficiently high contrast also when the cover layer has a thickness in the millimeter range.

An optical fingerprint imaging system with a light-passing cover plate on which a finger is placed, and with a backlight and a matrix sensor which is arranged between the cover plate and the backlight is known from WO 2017/045130 A1. At least one light shielding layer, preferably two light shielding layers separated from one another by a transparent layer, are arranged in front of the matrix sensor which lets light through between its individual sensor elements so that the cover plate can be illuminated by the backlighting. The light shielding layers have holes which are associated with a sensor element in each instance and which define a light pipe between the sensor element and the cover plate for each sensor element.

The reflection angle range from which light impinges on a sensor element is limited in that only light which arrives on a sensor element through one of the light pipes impinges on a sensor element, so that the contrast of fingerprint images can be improved and greater distances can be realized between the overlying finger and the matrix sensor.

US 2017/0161543 A1 discloses a display within the meaning of the present application having an integrated matrix sensor. The display comprises a plurality of transparent layers, the outer layer of which is the cover layer on whose surface a finger to be imaged can be placed and serves primarily as protective layer for the display pixels. In an embodiment example, the display pixels which together form a display matrix and the sensor elements which together form the matrix sensor are arranged on a blocking layer so as to nest together in a plane. In so doing, the display pixels are directed toward the cover layer with their light-emitting area in accordance with a conventional display. It is noted that the light of the display pixels and/or the light of a possible additional illumination can be used for recording the finger through the matrix sensor. The sensor elements of the matrix sensor which are protected from incident light of the display pixels face the blocking layer with their light-sensitive area. Below the sensor elements, the blocking layer has a first aperture and, associated with each sensor element, a second aperture which is offset in the same direction relative to the sensor element and through which light reflected by the cover layer can pass obliquely. The light passing through the first apertures is reflected in each instance at a reflecting layer via a further transparent layer adjoining the blocking layer, and a component of the light reflected at the latter impinges on a sensor element through the first apertures. In this case, compared with the above-cited WO 2017/045130 A1, a light pipe (acceptance cone) which strictly limits the reflection angle range from which light impinges on a sensor element is formed by a first aperture located directly in front of the sensor element and by a second aperture which is offset relative to the sensor element. The term "acceptance cone", in combination with the knowledge that it is limited by a round aperture which is offset relative to the sensor element, clarifies that it has an oblique conical shape. The opening angle of an oblique cone is smaller in the slope direction than perpendicular thereto, from which it may be concluded that the acceptance angle of the sensor element is smaller in slope direction than perpendicular thereto. The reflection angle range includes reflection angles which are far from a perpendicular light incidence, i.e., which impinge appreciably obliquely on the sensor element. As a result, in contrast to a light incidence from a strictly limited reflection angle range around the perpendicular light incidence as in a light pipe according to the above-cited WO 2017/045130 A1, the resulting contrast in a recording is not isotropic, i.e., for incident light from the direction of the aperture offset, the contrast is greater than perpendicular thereto.

In both of the publications cited above, a light pipe or acceptance cone is formed through at least one aperture, the reflection angle range from which light impinges on the respective sensor element or, more accurately, its light-sensitive surface, being limited by the light pipe or acceptance cone. In the case of US 2017/0161543 A1, cited above, in which the aperture which is decisive for limiting the reflection angle range is offset relative to the sensor element, the acceptance angle for the sensor element considered from the side of the sensor element is smaller in direction of the offset than in direction orthogonal thereto. As a result, a recording generated with the matrix sensor has a different contrast in the offset direction and in a direction extending orthogonal to the latter; that is, the contrast over the recording is not isotropic but rather directionally dependent. The reflection angle range is always identically limited for all of the sensor elements. The acceptance angle is selected as small as possible in order to receive the light directed to a sensor element only from a smallest possible partial area and, accordingly, to achieve a high contrast between papillary lines and papillary valleys.

SUMMARY OF THE INVENTION

It is the object of the invention to improve a display with integrated matrix sensor for recording the papillary structure of at least one finger such that it is suitable for making a recording which has an isotropic and high contrast. This object is met for a display with integrated matrix sensor by the features of claim 1.

Advantageous embodiments for a display with integrated matrix sensor according to claim 1 are indicated in the dependent claims 2 to 11.

A further object of the invention is to find a method by which corrected recordings with an isotropic and high contrast can be formed using a display with integrated matrix sensor according to the invention.

This object is met for a method with the features of claim 12.

Advantageous embodiments are indicated in the dependent claims 13 and 14.

Two alternatives have been found for carrying out these objectives.

The first alternative consists substantially in that the aperture is formed to be smaller in length in direction orthogonal to the direction of the offset of the aperture relative to the sensor element (offset direction) than in width in offset direction. Accordingly, the acceptance angle in the sensor elements which is larger than the acceptance angle in offset direction with the same length and width of the aperture in direction orthogonal to the offset direction can be reduced in direction orthogonal to the offset direction and adapted to the acceptance angle in offset direction. With this first alternative of a display with integrated matrix sensor, a recording with the highest possible resolution which has an isotropic and high contrast over the entire recording is made by means of all of the sensor elements of the matrix sensor.

Alternatively, the apertures are at least as large in direction orthogonal to the offset direction (length) as in offset direction (width) and are arranged to be offset in at least two different directions relative to the sensor elements. The angular diaphragms in which the apertures are offset in the same offset direction relative to the associated sensor element form a diaphragm group in each instance. This alternative is suitable for producing a partial recording by means of the sensor elements of a diaphragm group with only a portion of the sensor elements so that a quantity of partial recordings with reduced resolution identical to the quantity of diaphragm groups can be made simultaneously with the matrix sensor. A corrected recording which has a more isotropic and higher contrast than each of the partial recordings can be produced computationally from these partial recordings of reduced resolution.

An advantageous embodiment of the second alternative is based on the consideration that tissue structures such as the papillary structure of a finger have a regularity in that they represent a line structure, wherein the papillary lines have a distance from one another which is predominantly smaller by approximately one order of magnitude than an approximately linear segment of the papillary lines in length direction thereof. In order to direct as much light intensity as possible of reflected light from a partial area to a sensor element of a matrix sensor, the apertures are advantageously formed as slits with a slit length orthogonal to the direction of the offset of the aperture relative to the sensor element that is greater than a slit width in direction of the offset of the aperture relative to the sensor element. Accordingly, when the slit length extends in direction of the papillary lines and therefore in direction of the papillary valleys, appreciably more light can be directed to the sensor elements. Insofar as the slit length extends perpendicular to the papillary lines in the extreme case, the contrast and therefore the sharpness of the recording are worsened, but this worsening is compensated by the method according to the invention.

According to the invention, partial recordings with reduced resolution having a different contrast in different directions are generated by means of a plurality of groups of sensor elements which are associated, respectively, with a group of angular diaphragms with differently oriented slits. The partial recordings which are generated in each instance by groups of sensor elements in nested arrangement are divided into segments which are as small as possible but large enough that the line path direction is derivable from at least one segment of segments correlating with one another. The segments correlating with one another are weighted based on the line path direction and calculated to form a total segment. A corrected recording is produced from all of the total segments.

BRIEF DESCRIPTION OF THE DRAWINGS

The invention will be described in more detail in the following referring to embodiment examples with the aid of drawings. The drawings show:

FIG. 4 a schematic diagram of the second alternative for a second embodiment of a display according to the invention;

DETAILED DESCRIPTION OF THE PREFERRED EMBODIMENTS

Figure 1:
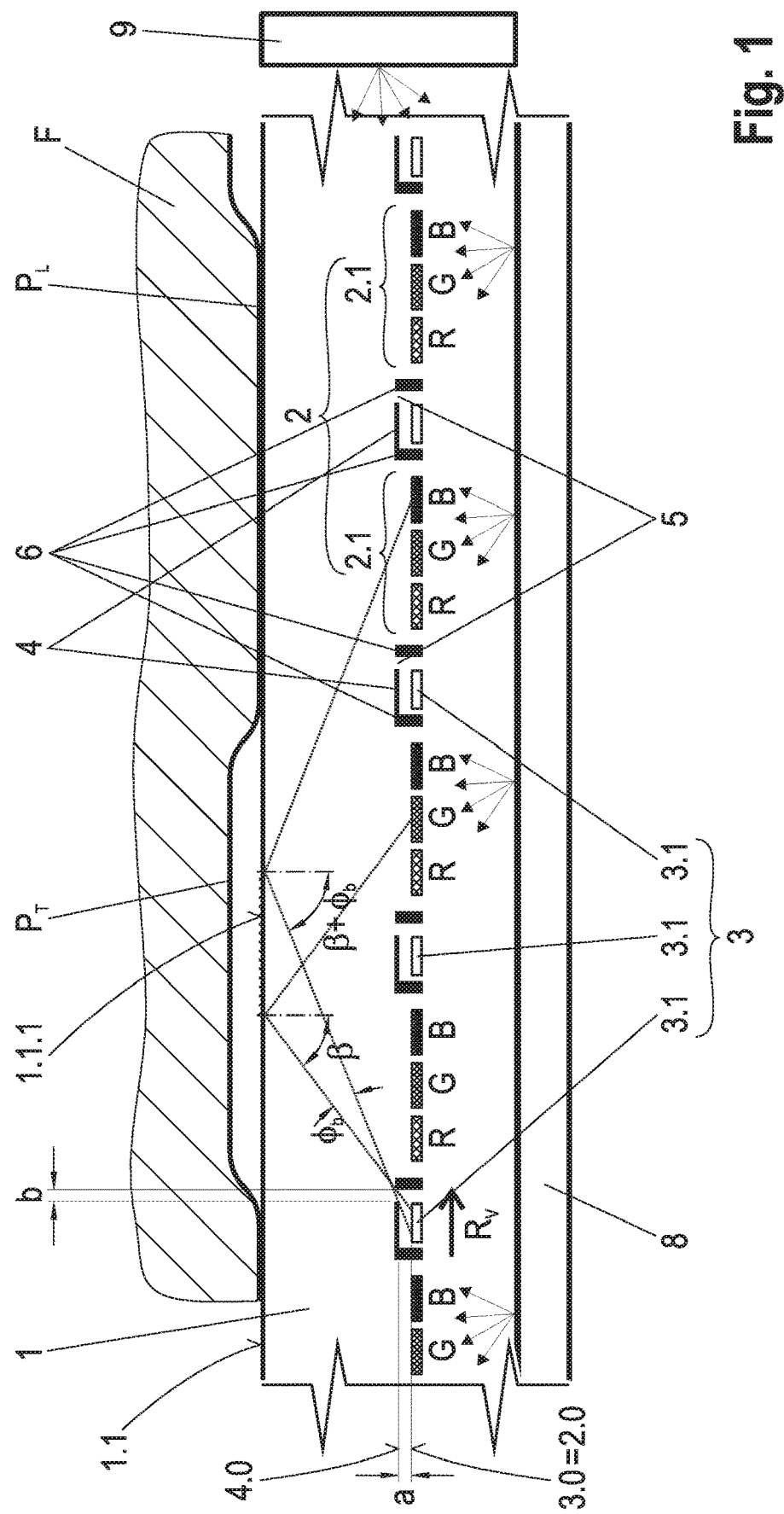
FIG. 1 a schematic diagram of a first alternative for a first embodiment of a display according to the invention.

FIG. 1 shows a schematic diagram for a first embodiment of a display with integrated matrix sensor 3 for imaging the papillary structure of at least one finger F, this papillary structure being formed by papillary lines PL and papillary valleys PT.

The display is a single-layer or multilayer transparent or semitransparent body 1 with a platen 1.1, an integrated display matrix 2 in a display plane 2.0, the integrated matrix sensor 3 in a sensor plane 3.0, with a plurality of sensor elements 3.1 and a plurality of integrated periodically disposed angular diaphragms 4 with apertures in a diaphragm plane 4.0. The platen 1.1, which is formed by an outer upper surface of the transparent or semitransparent body 1, and at least the sensor plane 3.0 and the diaphragm plane 4.0 are oriented parallel to one another. The thickness of the display is generally between 0.1 mm and 10 mm, preferably between 0.5 mm and 2 mm. The matrix sensor 3 comprises a plurality of periodically disposed sensor elements 3.1 with which one of the angular diaphragms 4 is associated in each instance. The angular diaphragms 4 are formed as planar elements and have, in each instance, an aperture which is arranged and dimensioned with respect to the sensor element 3.1, or more precisely the light-sensitive surface thereof, such that only light reflected from a defined reflection angle range at the platen 1.1 or at at least one finger F placed thereon, preferably total reflected light, can impinge obliquely on the sensor element 3.1 through this aperture. To this end, the apertures are arranged at a distance a in front of the sensor element 3.1 in orthogonal direction (viewing direction) to the platen 1.1 and are disposed to be offset relative to the associated sensor element 3.1 in a parallel direction (offset direction RV) parallel to the platen 1.1 such that, considered from orthogonal direction with respect to the platen 1.1, they are arranged next to the sensor element 3.1 so as to completely cover the latter. The angular diaphragms 4 comprise an opaque, preferably absorbent material. The matrix sensor 3 is connected to a controlling and computing unit for controlling, reading out and possibly analyzing and calculating recordings of the matrix sensor 3.

In this first embodiment, the display plane 2.0 and the sensor plane 3.0 coincide. For this reason, the diaphragm plane 4.0 is arranged in front of the display plane 2.0 in direction of the light reflected at the platen 1.1. In order that no stray light or light proceeding directly from display pixels 2.1 of the display matrix 2 can impinge on the sensor elements 3.1, the latter are enclosed over distance a by a stray light baffle 6 orthogonally adjoining the angular diaphragm 4.

The transparent or semitransparent body 1 can be formed from layers of different materials with different refractive indices in order to adapt the light in the wavelength range, reflection angle range or polarization direction to the generation of the recording of the at least one overlying finger F and/or, in case of an additional light source, possibly to direct the light for illumination of the platen 1.1 to the platen 1.1 at impingement angles greater than the critical angle.

The display pixels 2.1 which display primarily optical signals or graphics to the user of the display may serve simultaneously as illumination for the platen 1.1 and, therefore, of an overlying object, particularly a finger F. Alternatively or additionally, a backlight 8 can be provided and utilized as illumination, which backlight 8 advantageously directs light in an invisible wavelength range to the platen 1.1 through the display matrix 2 nested together with the matrix sensor 3. As an alternative to the backlight, an additional illumination 9 can be provided which, e.g., also in an invisible wavelength range, only directs light to the platen 1.1 at an angle greater than the critical angle. If total reflected light is to be used for the recording, it is important that the illumination emits light which impinges on the platen 1.1 at least partially at angles greater than or equal to the critical angle.

The sensor elements 3.1 can advantageously have an electronic control unit as shutter pixels for controlling the exposure time, e.g., as rolling shutter or global shutter as is disclosed in DE 10 2015 116 026 A1. The matrix sensor 3 is then a shutter pixel sensor. Accordingly, the exposure time, and therefore integration time, can be adapted to different brightnesses of the display which vary depending on the usage scenario of the user or different environmental conditions.

The apertures preferably have a regular shape. They may be round, oval or preferably slit-shaped, for example. The apertures have a maximum width in offset direction RV. In the preferred case of a slit-shaped aperture (slit aperture), the maximum width is slit width b. It has a maximum length in direction orthogonal to the offset direction RV which, in the preferred case of the slit aperture, is the slit length 1.

Figure 5A:
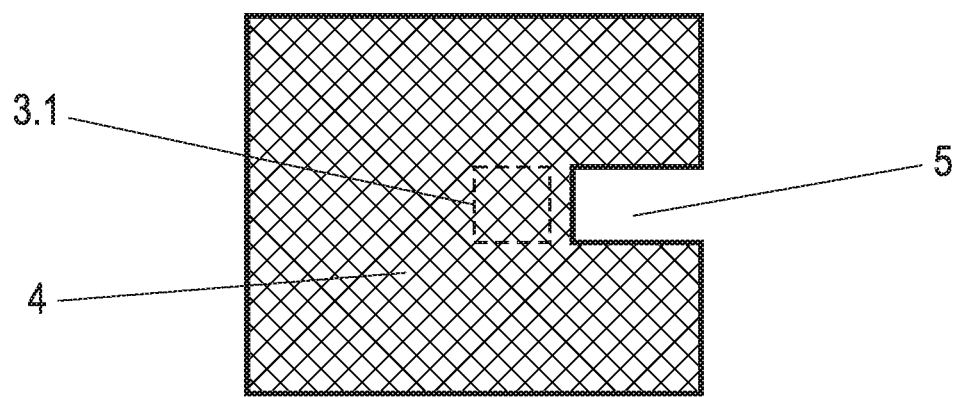
FIG. 5A one of the apertures in the form of a slit for the first alternative of a display.
Figure 5B:
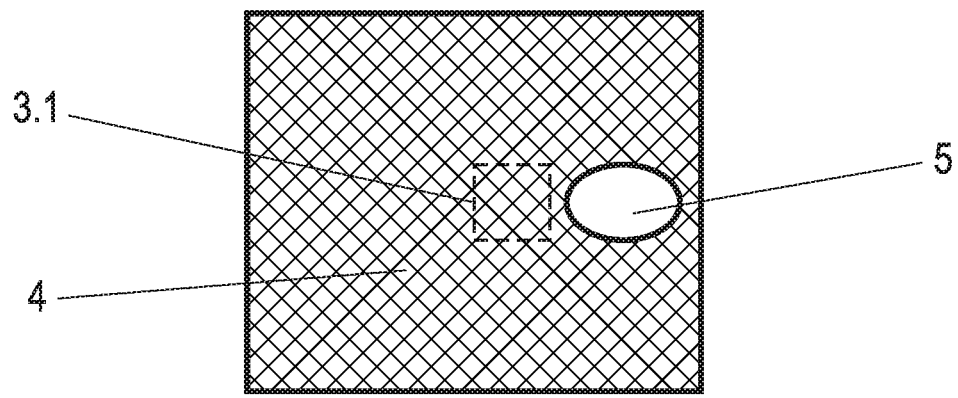
FIG. 5B one of the apertures in the form of an oval for the first alternative of a display.
Figure 6A:
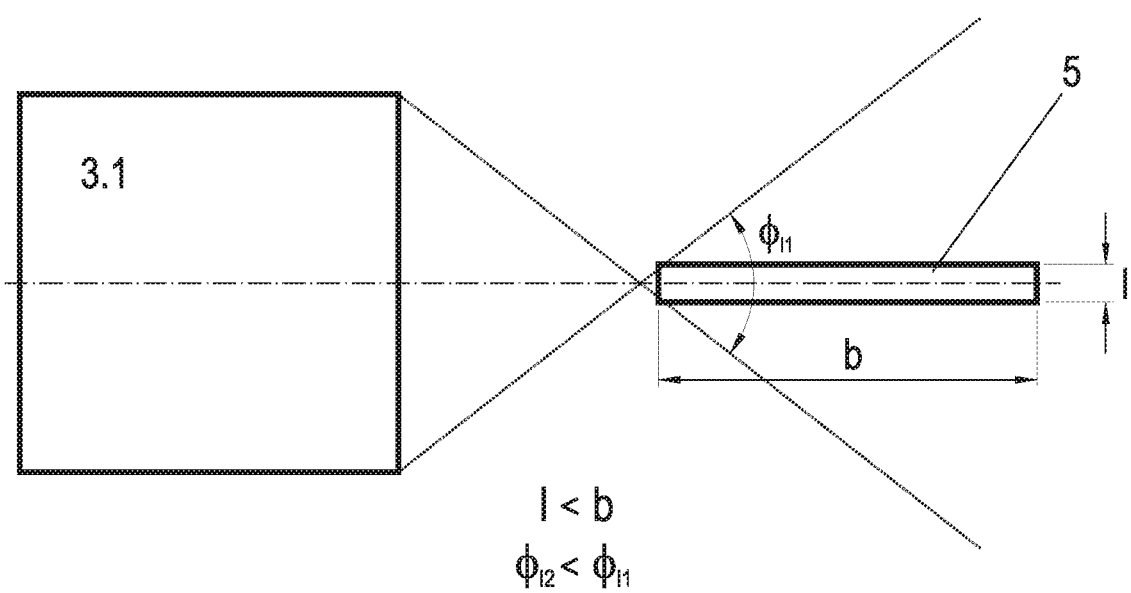
FIG. 6A a first embodiment of one of the apertures in the form of a slit to a sensor element in the first alternative of a display.
Figure 6B:
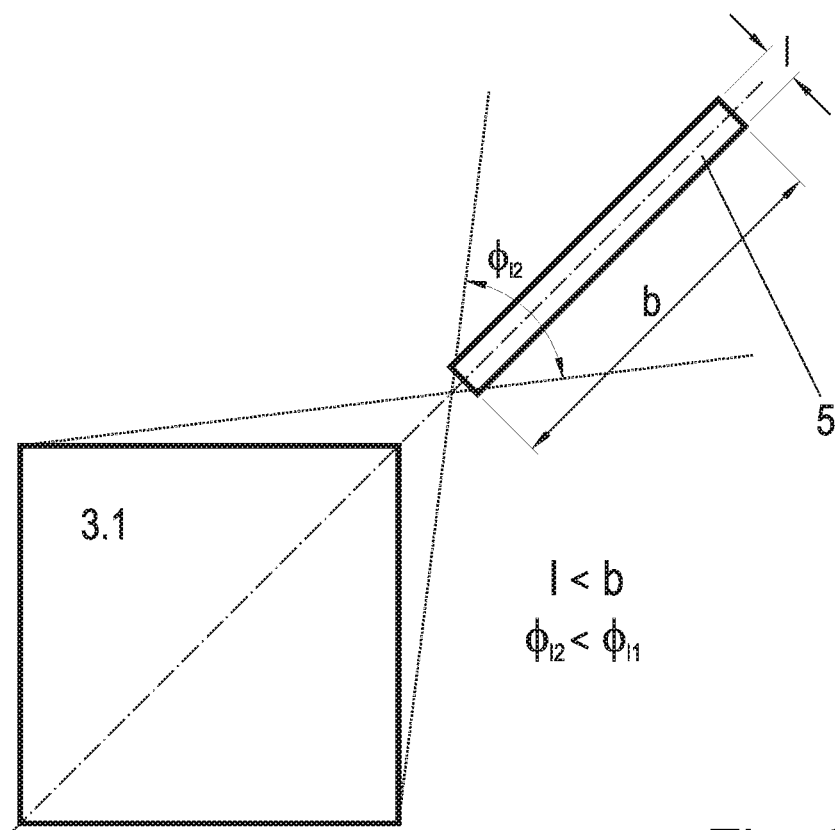
FIG. 6B a second embodiment of one of the apertures in the form of a slit to a sensor element in the first alternative of a display.

In a first alternative of the first embodiment of a display according to the invention, the maximum length, or in the preferred case the slit length 1, is smaller than the maximum width, or in the preferred case the slit width b. In this respect, it is smaller to the extent that an isotropic contrast is achieved in a recording by means of all of the sensor elements 3.1 of the matrix sensor 3. In contrast to the second alternative for the first embodiment which will be described later referring to FIG. 2, the apertures are all offset in the same offset direction RV relative to the sensor elements 3.1. Two advantageous embodiments for the apertures are shown in FIGS. 5A and 5B. According to FIG. 5A, the aperture in the angular diaphragm 4 is a rectangular slit 5 which opens toward the edge of the angular diaphragm 4 and is bounded by the adjoining stray light baffle 6 (see FIG. 1). The aperture in FIG. 5B is an oval or an ellipse. The shorter the maximum length, or in the preferred special case when the aperture is formed as slit 5, the slit length 1, the smaller the acceptance angle in the length direction. As is shown in FIGS. 6A and 6B referring to a rectangular slit 5 by way of example, the acceptance angle can be further decreased in this direction with the slit length 1 remaining the same, in that the slit 5, which in the case of a customary square sensor element 3.1 is arranged parallel to a lateral edge of the sensor element 3.1 in direction of its slit length 1 (see FIG. 6A), is arranged by way of example in direction of a surface diagonal (see FIG. 6B). This can be advantageous particularly when a further reduction in slit length 1 is technically impossible or requires substantial extra expenditure. The direction of the slit length 1 can also have any angle relative to a lateral edge of the sensor element 3.1.

Figure 2:
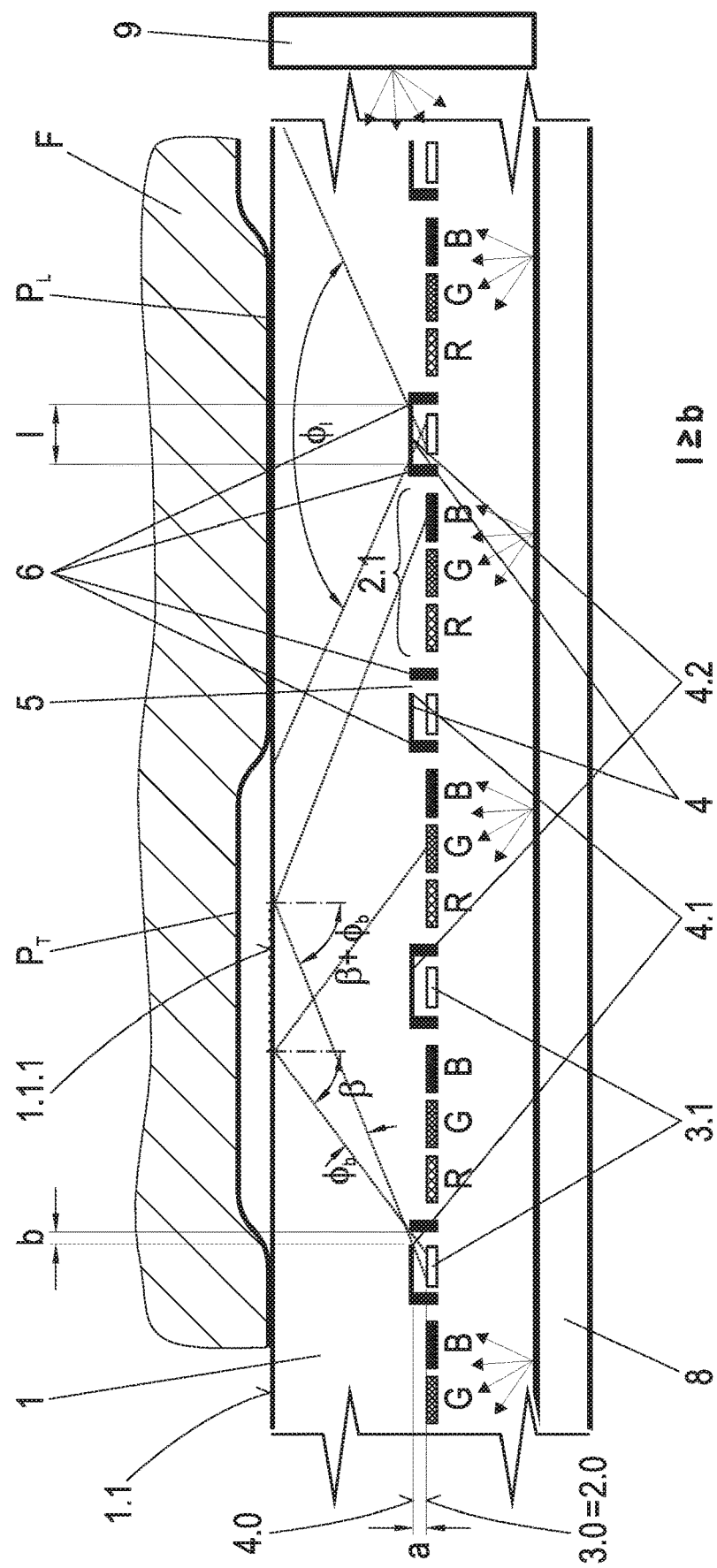
FIG. 2 a schematic diagram of a second alternative for a first embodiment of a display according to the invention.

In a second alternative of the first embodiment, shown in FIG. 2, the maximum length of the apertures, or in the preferred case of slits 5 as apertures, the slit length 1, is greater than or equal to the maximum width, or in the preferred case, the slit width b. In the following description of the second alternative, it will be assumed for the sake of simplicity that the apertures are formed as rectangular slits 5 for which the slit length 1 is greater than the slit width b, which is also advantageous. In a particularly advantageous manner, the slit length 1 is at least double the slit width b. Correspondingly, the acceptance angle φb of the sensor element 3.1 is appreciably smaller in direction of the slit width b, i.e., the offset direction RV, compared with the acceptance angle φ1 in direction of the slit length 1, and a partial area 1.1.1 of the platen 1.1 from which light impinges on a sensor element 3.1 has, in direction of the slit length 1, the area length which is greater than its area width approximately in proportion to the ratio between the slit length 1 and the slit width b. Accordingly, a recording has a lower contrast in direction of the area length than in direction of the area width.

According to the invention, in the case where the slit length 1 is greater than or equal to the slit width b, the angular diaphragms 4 are alternatingly disposed such that the longitudinal direction RS, determined by the orientation of the slit length 1, of two adjacent angular diaphragms 4 is different in each instance. In so doing, the angular diaphragms 4 form at least two diaphragm groups 4.1, ..., 4.4, and the angular diaphragms 4 of the at least two diaphragm groups 4.1, ..., 4.4 have the same longitudinal direction RS of the slit 5 in each instance. The angular diaphragms 4 of the at least two diaphragm groups 4.1, ..., 4.4 are alternatingly disposed such that the longitudinal directions RS of the slits 5 are oriented differently so that the partial areas 1.1.1 associated, respectively, with a diaphragm group 4.1, ..., 4.4 have a different orientation correlating with the longitudinal direction RS in which the slits 5 have the same slit length 1.

Referring to two sensor elements 3.1 with an angular diaphragm 4 arranged in front, respectively, in which the slit lengths 1 extend orthogonal to one another, FIG. 2 shows the reflection angle ranges and acceptance angle acquired in each instance.

An angular diaphragm 4 with a slit 5 whose slit width b lies in the drawing plane is arranged in front of the first sensor element 3.1 shown on the left-hand side. The reflection angle range which is determined by the relative position of the slit 5 with respect to the sensor element 3.1 and by the dimension of the slit width b and of the sensor element 3.1 (by this is always meant the light-sensitive surface of the sensor element 3.1) is limited by edge rays which, with a perpendicular to the platen 1.1, form a first angle β, preferably greater than the critical angle of the total reflection, and a second angle β+φb, where φb is the acceptance angle in direction of the slit width b which is adjustable at a predetermined size of the sensor element 3.1 via the slit width b and distance a. Arranged in front of the second sensor element 3.1 shown at left is an angular diaphragm 4 with a slit 5 whose slit length 1 lies in the drawing plane. With a given size of the sensor element 3.1, the acceptance angle φ1 is adjustable in direction of the slit length 1 through the selection of the slit length 1.

Together with the thickness of the transparent body 1 above the diaphragm plane 4.0, the acceptance angle φb in direction of the slit width b and the acceptance angle φ1 in direction of the slit length 1 are decisive for the area width and the area length of the partial area 1.1.1 from which light impinges on the respective sensor element 3.1, which is shown in FIGS. 7A to 7D.

Figure 8:
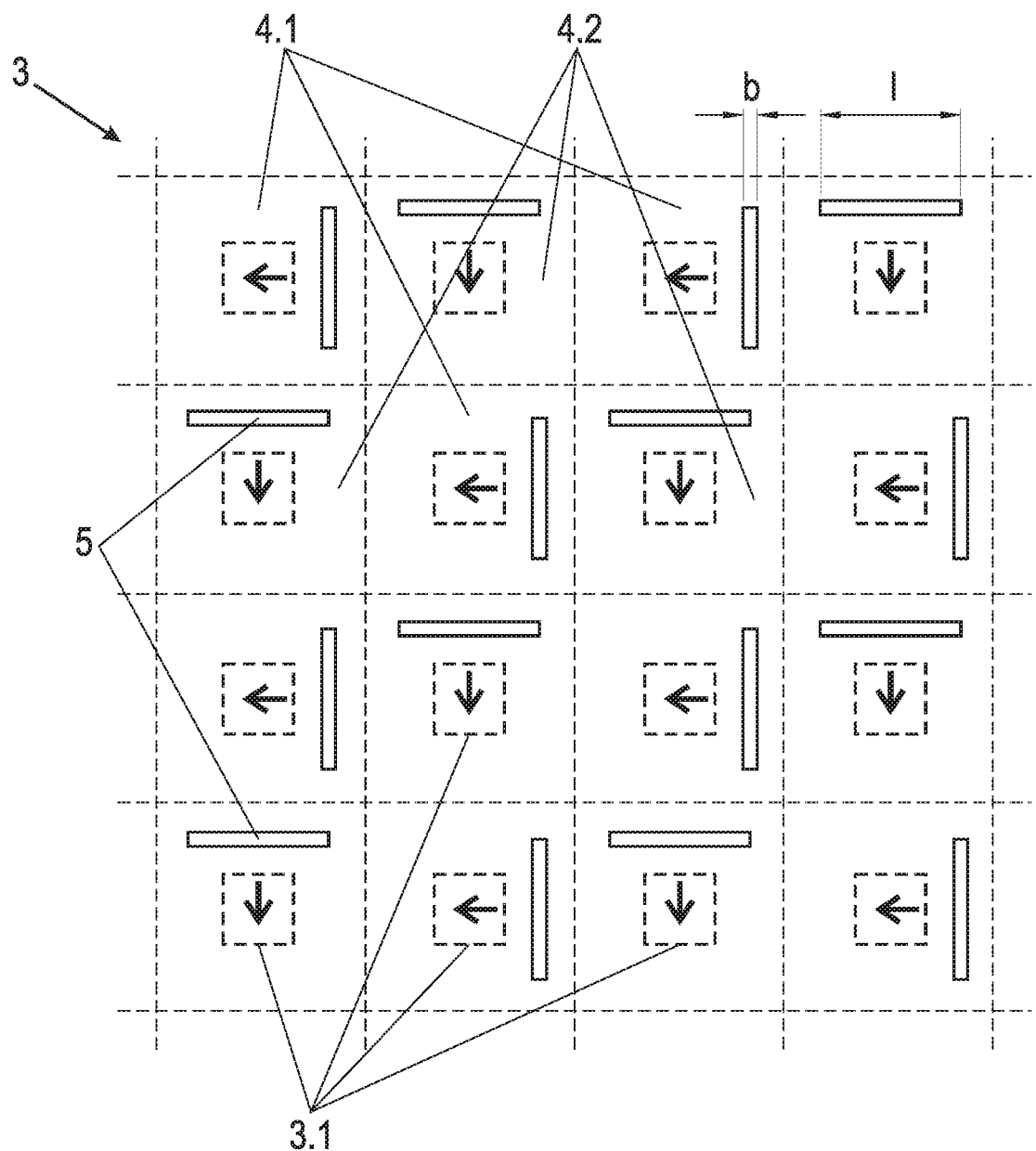
FIG. 8 a schematic diagram of a matrix sensor with two diaphragm groups.
Figure 9:
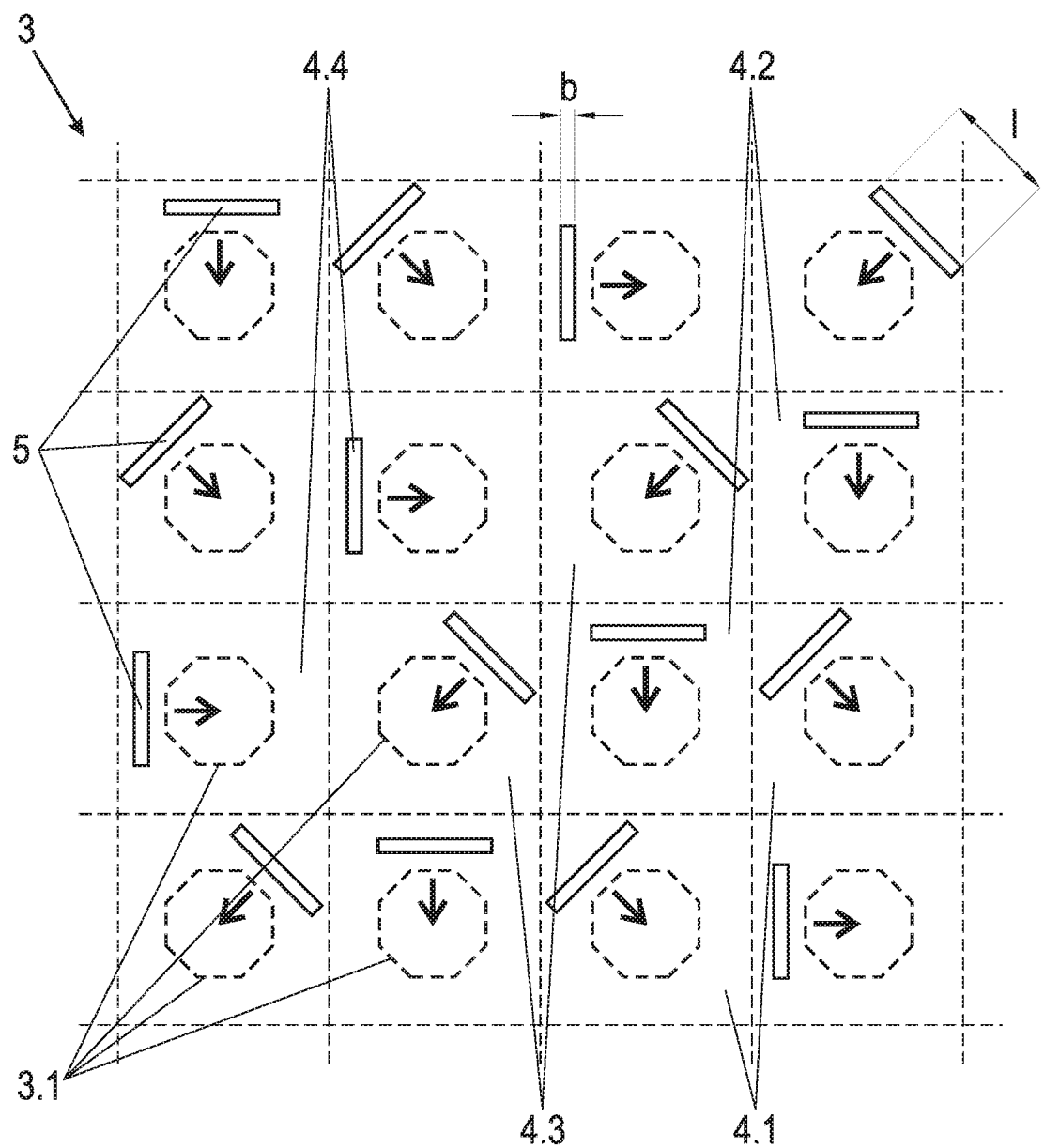
FIG. 9 a schematic view of a matrix sensor with four diaphragm groups.

The basic construction of a display described referring to the first embodiment is not dependent on the geometric configuration of the sensor elements 3.1 which advantageously have the shape of a regular equilateral polygon. The slits 5 of the respective angular diaphragms 4 which are arranged in front in each instance are oriented groupwise with the slit length 1 parallel, respectively, to a side of the sensor element 3.1. The sensor elements 3.1 may also be formed differently, e.g., round or oval. Examples of this will be shown later referring to FIGS. 8 and 9.

Figure 3:
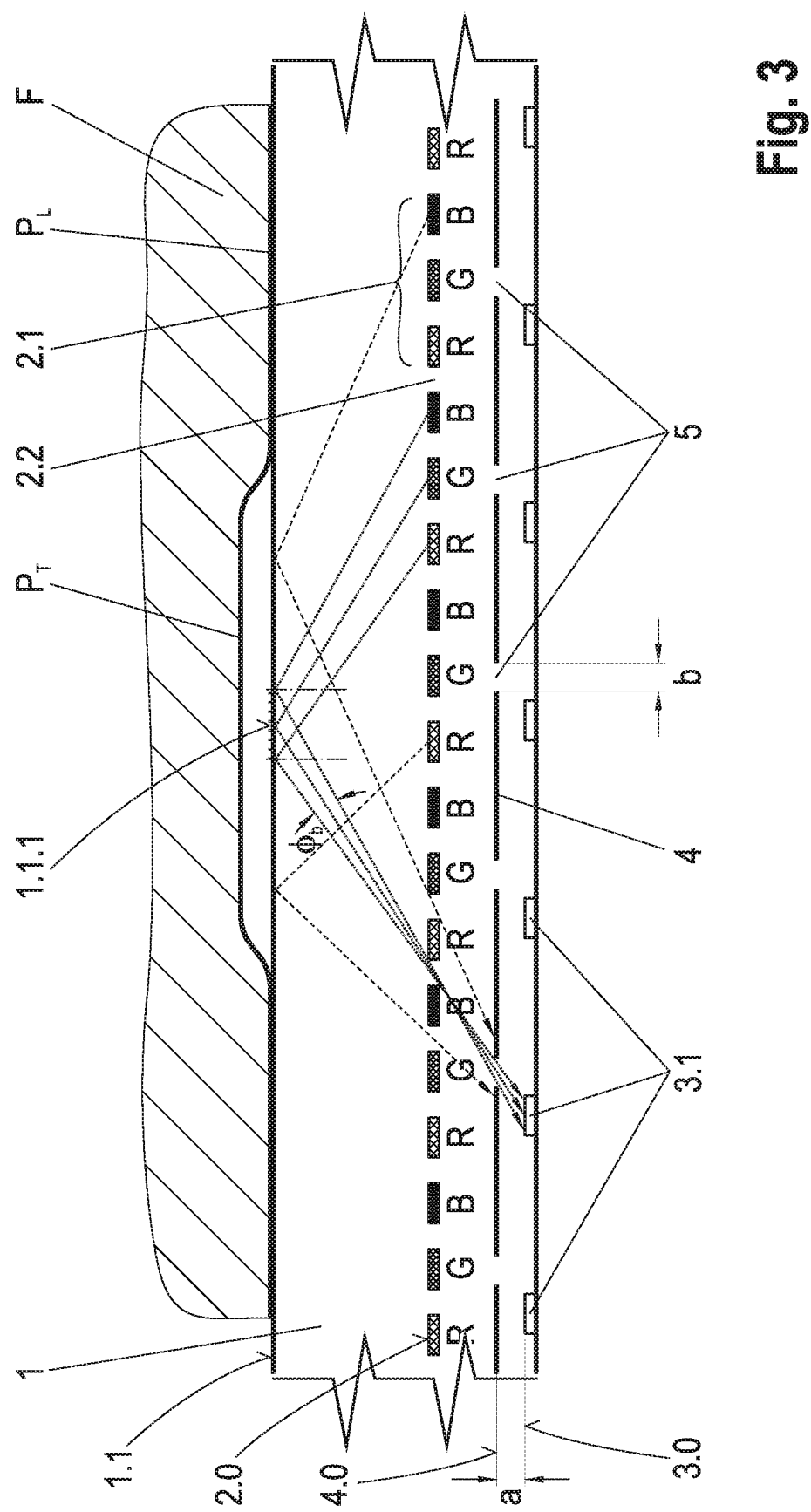
FIG. 3 a schematic diagram of the first alternative for a second embodiment of a display according to the invention.

A schematic diagram for a second embodiment of a display with integrated matrix sensor 3 for mapping the papillary structure of at least one finger F is shown for the first alternative in FIG. 3 and for the second alternative in FIG. 4.

This embodiment differs from the first embodiment essentially only in that the display plane 2.0 is located between the platen 1.1 and the sensor plane 3.0. The display matrix 2 must necessarily have transparent regions 2.2 or be semitransparent in its entirety so that light reflected at the platen 1.1 can reach the sensor elements 3.1. The angular diaphragms 4 arranged in front of the matrix sensor 3 advantageously form a contiguous diaphragm layer which is interrupted only by the apertures, preferably in the form of slits 5. Additional stray light baffles 6 are not required in this second embodiment. All the rest of the descriptions referring to the first embodiment also apply to the second embodiment. An advantage of this second embodiment consists in the comparatively close tolerance of the relative positions of the apertures with respect to one another and the comparatively high accuracy with which the acceptance angle and the reflection angle range can be fixed.

Figure 7A:
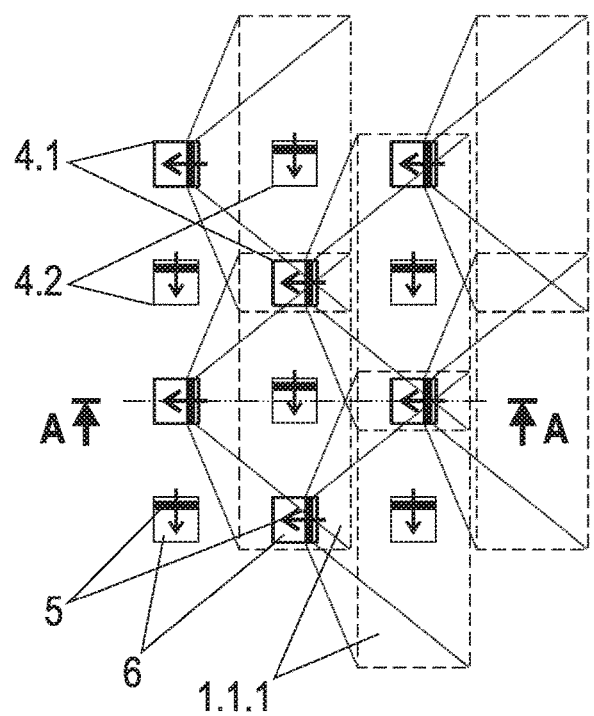
FIG. 7A a schematic diagram of the partial areas associated with the angular diaphragms of a first diaphragm group.
Figure 7B:
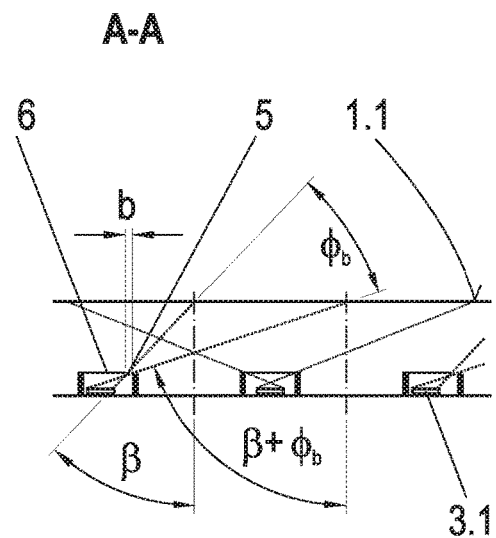
FIG. 7B a diagram showing highlighted angles of the detected light in direction of the slit width.
Figure 7C:
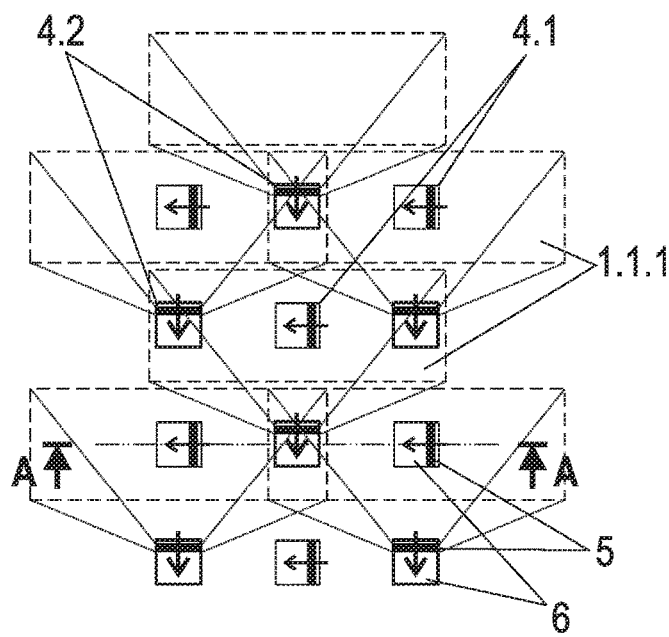
FIG. 7C a schematic diagram of the partial areas associated with the angular diaphragms of a second diaphragm group.
Figure 7D:
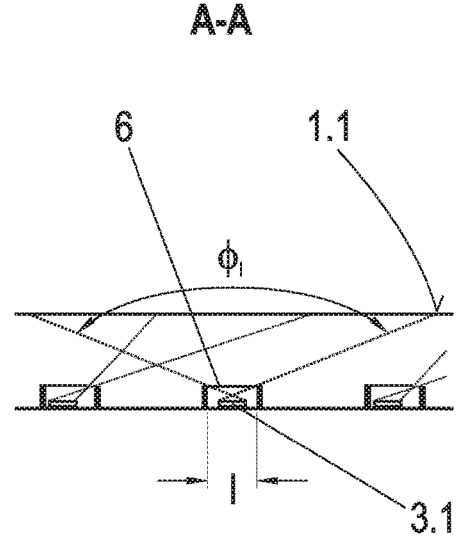
FIG. 7D a diagram showing a highlighted angle of the detected light in direction of the slit length.

The angular diaphragms 4 of a first diaphragm group 4.1 and the angular diaphragms 4 of a second diaphragm group 4.2 are schematically shown, respectively, in FIG. 7A and FIG. 7C with partial areas 1.1.1 which are associated with the angular diaphragms 4 in each instance and from which reflected light impinges on the respective associated sensor element 3.1. For the sake of simplicity, the partial areas 1.1.1 are shown as rectangles. In fact, these partial areas 1.1.1 preferably have an elliptical shape or a round shape.

The partial areas 1.1.1 associated with the angular diaphragms 4 of a diaphragm group 4.1-4.4 in each instance cover the platen 1.1 in a closed manner so that a complete recording is generated in each instance through the sensor elements 3.1 of each of the diaphragm groups 4.1-4.4.

The partial areas 1.1.1 and the slits 5 are identically oriented; that is, the slit width b and area width and the slit length 1 and area length extend in the same direction. The direction of the slit length 1 is the longitudinal direction RS. If it is imagined for better understanding of the way the different longitudinal directions RS function that a finger F is placed on the platen 1.1 in such a way that the line path direction RL of its papillary structure extends exactly in the longitudinal direction RS of the first diaphragm group 4.1 and orthogonal to the longitudinal direction RS of the second diaphragm group 4.2, it will readily be seen that a partial recording via the sensor elements 3.1 of the first diaphragm group 4.1 provides a partial recording with maximum contrast because, to simplify, the sensor elements 3.1 detect either a maximum light intensity or no light intensity, whereas the sensor elements 3.1 of the second diaphragm group 4.2 always receive a mean light intensity. Based on this fundamental understanding, it will be appreciated that the greater the quantity of diaphragm groups, the greater the quantity of differentiated partial recordings that can be recorded in each instance with the sensor elements 3.1 of a diaphragm group which are high in contrast to a varying degree depending on the angular position of the longitudinal direction RS of the slits 5 of the diaphragm group relative to the line path direction RL.

A method will be described in the following referring to FIG. 10 as carried out with a display, according to the invention, with an integrated matrix center 3 in accordance with the second alternative. In this method, an initial recording of at least one finger F lying on the platen 1.1 is broken up into individual partial recordings TA1-TA4, each of which is made by the sensor elements 3.1 of one of the diaphragm groups 4.1-4.4, so as to transform them into a corrected recording Ak with a more isotropic and higher contrast than that of the partial recordings TA1-TA4.

Figure 10:
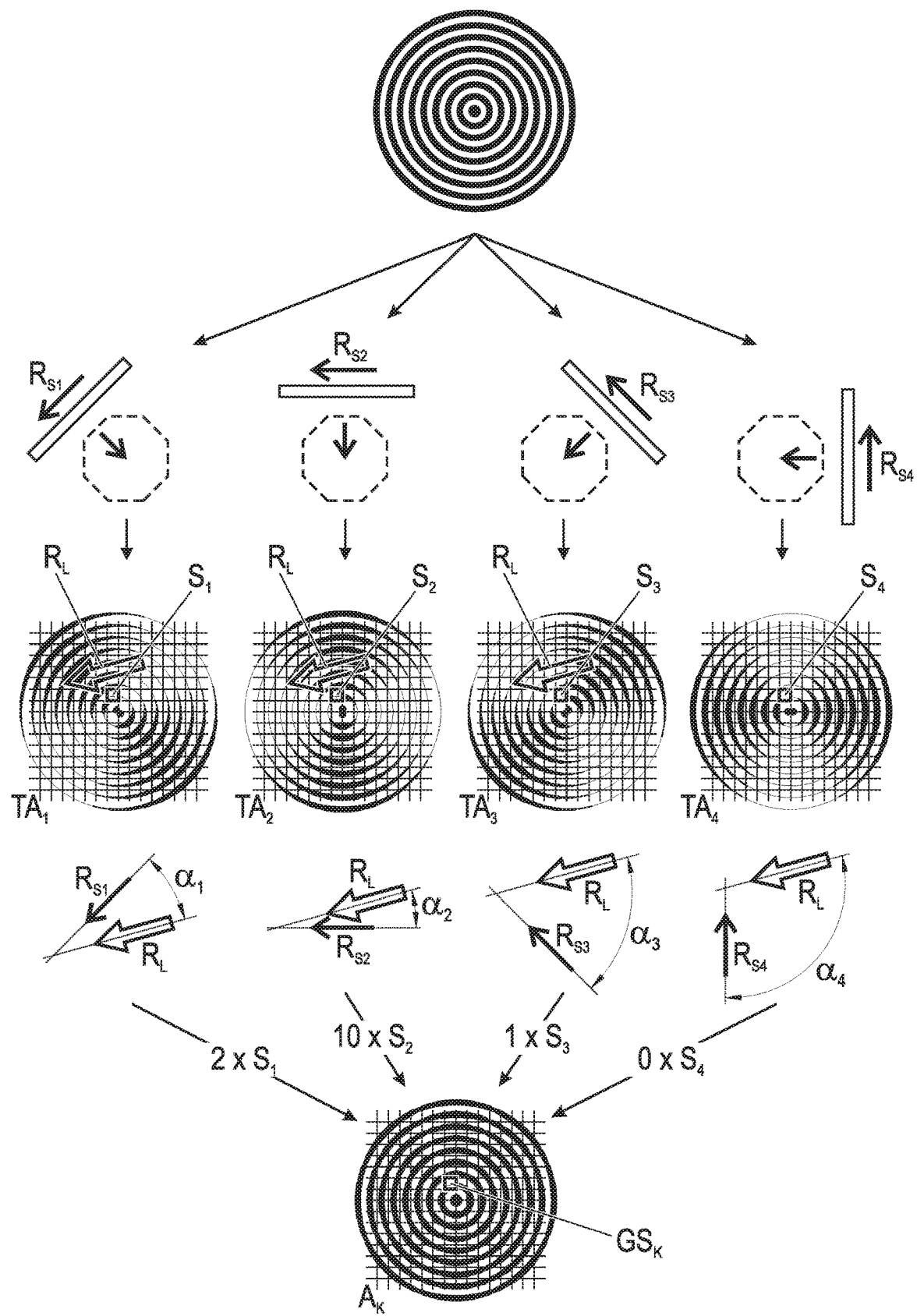
FIG. 10 a process flow for a method in pictorial representation.

For this purpose, a finger F whose papillary structure is represented in a simplified manner in FIG. 10 by coaxial circular rings, or a plurality of fingers F simultaneously, are placed on the platen 1.1 of the display, the platen 1.1 is illuminated by means of the display, and an initial recording of the papillary structure of the at least one finger F is made by controlling the matrix sensor 3, this initial recording resulting from signals of all of the sensor elements 3.1 which correlate, respectively, with a respective detected light intensity. As a result of the advantageous configuration of the apertures as slits 5 with a slit length 1 greater than the slit width b, a higher light intensity is advantageously detected in sum through the matrix sensor 3 compared with apertures having an identical extension in two directions orthogonal to one another.

In this embodiment example, the initial recording is divided into four individual partial recordings TA1-TA4, each of which is associated with one of the four diaphragm groups 4.1-4.4 which are represented in this case by the longitudinal directions RS1-RS4 of the respective angular diaphragm 4. As will be clearly seen, the contrast in the four partial recordings TA1-TA4 varies in quality within the respective partial recording; that is, it is not isotropic.

Each of the four partial recordings TA1-TA4 is divided into a plurality of segments from which groups of segments S1-S4 correlating with one another are formed.

For each partial recording TA1-TA4, a correlating segment S1-S4 of a group is highlighted in the drawings. Referring to the depicted correlating segments S1-S4 of a group, the further method flow is described by way of example for all of the other segments. The segments are at least large enough that the line path direction RL for this group of correlating segments S1-S4 is derivable in each instance from at least one of the respective correlating segments S1-S4. In the example shown in FIG. 10, the contrast in segment S4 is so poor that the line path direction RL is not immediately derivable from this segment S4.

The respective longitudinal directions RS1, RS2, RS3, RS4 of the slits 5 of the associated diaphragm groups 4.1-4.4 are associated with the selected segments S1, S2, S3, S4, and an angle difference α1-α4 is formed, respectively, from the longitudinal directions RS1-RS4 and the respective line path direction RL. The correlating segments S1-S4 are weighted depending on the magnitude of the angle difference α1-α4; the smaller the angle difference α1-α4, the higher the weighting. In FIG. 10, exemplary weighting factors are associated, respectively, with the correlating segments S1, S2, S3, S4. A corrected total segment GSk is calculated from the selected segments S1-S4 of a group taking the weighting into account. Corrected total segments GSk are formed in the same manner from all of the segments correlating with one another. Subsequently, all of the corrected total segments GSk are combined to form a corrected recording Ak. The corrected recording Ak has an at least approximately isotropic and higher contrast in all directions compared to the initial recording (not shown).

In order to reduce the effort in calculating the corrected total segments GSk, the segments in which the longitudinal directions RS of the slits 5 form a greater angle difference than the smallest angle difference α1-α4 with the line path direction RL derived for the correlating segments S1-S4 can advantageously be weighted to zero.

REFERENCE CHARACTERS 1 transparent or semitransparent body
1.1 platen
1.1.1 partial area
2 display matrix
2.0 display plane
2.1 display pixel
2.2 transparent region of the display matrix 2

3 matrix sensor
3.0 sensor plane
3.1 sensor element
4 angular diaphragm
4.0 diaphragm plane
4.1 first diaphragm group
4.2 second diaphragm group
5 slit
6 stray light baffle
8 backlight
9 additional illumination
1 slit length
b slit width
$R_S$ longitudinal direction
$R_L$ line path direction
$R_V$ offset direction
a distance
$\varphi_b$ acceptance angle in direction
$\varphi_1$ acceptance angle in direction
$\alpha_1$-$\alpha_4$ angle difference
$\beta$ first angle
$\beta+\varphi_b$ second angle
F finger
$P_L$ papillary line
$P_T$ papillary valley
$TA_1$-$TA_4$ partial recordings
$S_1$-$S_4$ selected segments
$GS_k$ corrected total segment
$A_k$ corrected recording

What is claimed is:

1. A display with an integrated matrix sensor for optical recording of a papillary structure of at least one finger (F), comprising:
   a single-layer or multilayer transparent or semitransparent body with a platen;
   an integrated display matrix in a display plane;
   a diaphragm plane extending between the platen and a sensor plane;
   the integrated matrix sensor disposed in the a sensor plane and comprising a plurality of sensor elements;
   integrated angular diaphragms with apertures in a diaphragm plane;
   the angular diaphragms being arranged so as to completely cover the plurality of sensor elements in a direction orthogonal to the platen each integrated angular diaphragm being associated with a sensor element of the plurality of sensor elements, the angular diaphragms forming at least two diaphragm groups of angular diaphragms with a differently oriented longitudinal direction ($R_s$) of the apertures which are alternatingly disposed such that adjacent angular diaphragms have different longitudinal direction ($R_3$) of the apertures; and
   the apertures in angular diaphragms arranged so as to be offset with respect to the plurality of sensor elements in an offset direction ($R_v$) such that only light reflected at a partial area of the platen obliquely impinges on an associated sensor element from a limited reflection angle range through the apertures;
   wherein the apertures have a maximum width in the offset direction ($R_v$) and a maximum length in a direction orthogonal to the offset direction ($R_v$), wherein the maximum length is less than the maximum width, or wherein the apertures have the maximum width in the offset direction ($R_v$) and the maximum length in the direction orthogonal to the offset direction ($R_v$) in the longitudinal direction ($R_s$), wherein the maximum length is greater than or equal to the maximum width.

2. The display with the integrated matrix sensor according to claim 1, wherein the apertures are rectangular slits with a maximum width being a slit width (b), and with a maximum length being a slit length.

3. The display with the integrated matrix sensor according to claim 2, wherein the sensor elements have the shape of an equilateral regular polygon, and the slits are oriented in groups corresponding to the at least two diaphragm groups in the longitudinal direction ($R_s$) parallel to a side of the sensor elements.

4. The display with the integrated matrix sensor according to claim 3, wherein the sensor elements have a rectangular shape, and wherein the angular diaphragms form two diaphragm groups having slits oriented orthogonally to one another.

5. The display with the integrated matrix sensor according to claim 2, wherein a shape of the sensor elements is a square, and the slit width (b) is oriented in a direction of a diagonal of the square.

6. The display with the integrated matrix sensor according to claim 1, wherein the display plane and the sensor plane coincide, and wherein the angular diaphragms are individual planar associated in each instance with a stray light baffle, each stray light baffle surrounding each sensor element of the plurality of sensor elements and orthogonally adjoining each angular diaphragm to prevent stray light or light proceeding directly from display pixels of the display matrix from impinging on the plurality of sensor elements.

7. The display with the integrated matrix sensor according to claim 1, wherein the display plane extends between the platen and the sensor plane, and wherein the display matrix has transparent regions through which light reflected at the platen impinges on the angular diaphragms arranged below the display plane.

8. The display with the integrated matrix sensor according to claim 7, wherein the angular diaphragms form a contiguous layer.

9. The display with the integrated matrix sensor according to claim 1, partial areas associated with the angular diaphragms of the at least two diaphragm groups cover the platen in a closed manner to generate a complete recording through the plurality of sensor elements of each of the at least two diaphragm groups.

10. The display with the integrated matrix sensor according to claim 1, wherein the reflection angle range is selected such that only totally reflected light impinges on the sensor elements.

11. The display with the integrated matrix sensor according to claim 1, wherein the matrix sensor is a shutter pixel sensor.

12. A method for optical recording of a papillary structure of at least one finger (F), the method comprising:
   providing a display with an integrated matrix sensor and a platen for placing the at least one finger (F) on the platen; and
   initially recording the papillary structure of the at least one finger (F) by controlling the matrix sensor with a plurality of sensor elements to generate results of an initial recording from signals of the plurality of sensor elements the signals correlating with a light intensity detected in each instance;
   dividing the initial recording into individual partial recordings ($TA_1$-$TA_4$) with reduced resolution, the partial recordings ($TA_1$-$TA_4$) being associated with one of the diaphragm groups (4.1, . . . , 4.4), respectively, and with associated sensors of the plurality of sensor elements;

breaking down the partial recordings ($TA_1$-$TA_4$) into a plurality of segments to form groups of segments ($S_1$-$S_4$) correlating with one another;

deriving a line path direction ($R_L$) for the group of segments ($S_1$-$S_4$)4) from at least one of the segments ($S_1$-$S_4$) correlating with each other in each instances;

determining an angle difference ($\alpha_1$-$\alpha_4$) in each instance between the line path direction ($R_L$) of a respective correlating segment of the group of segments ($S_1$-$S_4$) and the respective longitudinal directions ($R_{S1}$-$R_{S4}$) of the apertures of the associated diaphragm groups (4.1, . . . , 4.4);

weighting the correlating segments ($S_1$-$S_4$) depending on a magnitude of the angle difference ($\alpha_1$-$\alpha_4$), wherein a smaller angle difference ($\alpha_1$-$\alpha_4$) corresponds to a higher weighting;

a corrected total segment $GS_k$ from the respective correlating segments ($S_1$-$S_4$) taking into account the weighting; and combing all of the corrected total segments $GS_k$ to form a corrected recording ($A_k$).

13. The method according to claim 12, wherein only a minimal number of the plurality of sensor elements is associated with one of the segments which are sufficient to allow the line path direction ($R_L$) of the recorded papillary structure to be derived from the signals of the segments ($S_1$-$S_4$) correlating with one another.

14. The method according to claim 12, wherein those correlating segments ($S_1$-$S_4$) in which the longitudinal directions ($R_s$) of the apertures form the angle difference ($\alpha_1$-$\alpha_4$) with the line path direction ($R_L$) derived for the correlating segments ($S_1$-$S_4$) that is greater than the smallest angle difference ($\alpha_1$-$\alpha_4$) are weighted to.

* * * * *